(12) United States Patent
Nishijima et al.

(10) Patent No.: US 11,608,664 B2
(45) Date of Patent: Mar. 21, 2023

(54) VEHICLE DOOR LATCH APPARATUS

(71) Applicant: MITSUI KINZOKU ACT CORPORATION, Yokohama (JP)

(72) Inventors: Hirotaka Nishijima, Yokohama (JP);
Shintaro Okawa, Yokohama (JP);
Katsuyuki Ishiguro, Yokohama (JP);
Shunsuke Tamura, Yokohama (JP);
Hibiki Ogura, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 304 days.

(21) Appl. No.: 16/954,352

(22) PCT Filed: May 14, 2018

(86) PCT No.: PCT/JP2018/018529
§ 371 (c)(1),
(2) Date: Jun. 16, 2020

(87) PCT Pub. No.: WO2019/130618
PCT Pub. Date: Jul. 4, 2019

(65) Prior Publication Data
US 2021/0087863 A1    Mar. 25, 2021

(30) Foreign Application Priority Data

Dec. 25, 2017  (JP) .............................. JP2017-248491
Mar. 23, 2018  (JP) .............................. JP2018-057245

(51) Int. Cl.
*E05B 85/26*   (2014.01)
*E05B 79/08*   (2014.01)
*E05B 81/14*   (2014.01)

(52) U.S. Cl.
CPC .............. *E05B 85/26* (2013.01); *E05B 79/08* (2013.01); *E05B 81/14* (2013.01)

(58) Field of Classification Search
CPC .......... E05B 81/06; E05B 81/14; E05B 81/18; E05B 81/30; E05B 81/34; E05B 81/42;
(Continued)

(56) References Cited

U.S. PATENT DOCUMENTS 5,092,639 A  *  3/1992  Di Giusto ............... E05B 85/26
                                                    292/216
5,188,406 A     2/1993  Sterzenbach et al.
(Continued)

FOREIGN PATENT DOCUMENTS

DE          19913666 A1 *  9/2000  ............. E05B 77/42
DE     10 2007 045 228 A1   2/2008
(Continued)

OTHER PUBLICATIONS

International Search Report dated Jul. 31, 2018, issued in counterpart International Application No. PCT/JP2018/018529 (2 pages).
(Continued)

*Primary Examiner* — Kristina R Fulton
*Assistant Examiner* — Noah Horowitz
(74) *Attorney, Agent, or Firm* — WHDA, LLP

(57) ABSTRACT

Vehicle door latch apparatus has; latch that engages strike and that rotates from an unlatched position to a full-latch over rotating position; ratchet member that is rotatably supported by ratchet shaft, wherein ratchet member has pawl portion that is movable between a latch engaging position, where pawl portion can face full-latching engaging portion of latch, and a latch releasing position, where pawl portion is not engaged with full-latching engaging portion; and ratchet restrainer that is positioned on a side of ratchet member and that restrains ratchet member. Ratchet member is configured to be pushed out from latch engaging position to a latch releasing position by release component force F2 that acts on ratchet member in a latch releasing direction,
(Continued)

wherein release component force F2 is generated when latch returning force that acts on latch is applied to ratchet member at the latch engaging position.

6 Claims, 13 Drawing Sheets

(58) Field of Classification Search
CPC .......... E05B 81/48; E05B 81/90; E05B 85/20; E05B 85/24; E05B 85/243; E05B 85/26; E05B 83/36; E05B 79/08; Y10T 292/1047; Y10T 292/1078; Y10T 292/1082; Y10S 292/23
See application file for complete search history.

(56) References Cited

U.S. PATENT DOCUMENTS

| | | | | |
|---|---|---|---|---|
| 8,474,888 | B2* | 7/2013 | Tomaszewski | ......... E05B 77/30 |
| | | | | 292/216 |
| 8,596,694 | B2 | 12/2013 | Taurasi et al. | |
| 8,876,176 | B2 | 11/2014 | Spurr et al. | |
| 9,765,554 | B2* | 9/2017 | Gumbo | ................... E05B 81/70 |
| 10,648,204 | B2 | 5/2020 | Cumbo et al. | |
| 11,035,156 | B2* | 6/2021 | Damboiu | ................ E05B 81/14 |
| 2009/0199605 | A1 | 8/2009 | Spurr et al. | |
| 2010/0052336 | A1 | 3/2010 | Bendel et al. | |
| 2011/0012376 | A1 | 1/2011 | Hunt et al. | |
| 2014/0062100 | A1 | 3/2014 | Tamura | |
| 2014/0091581 | A1 | 4/2014 | Taurasi et al. | |
| 2015/0097379 | A1 | 4/2015 | Spurr et al. | |
| 2015/0211266 | A1 | 7/2015 | Spurr et al. | |
| 2016/0076277 | A1* | 3/2016 | Kouzu | ...................... E05C 3/12 |
| | | | | 292/201 |
| 2017/0089103 | A1 | 3/2017 | Ottino et al. | |
| 2021/0156175 | A1* | 5/2021 | Ishiguro | .................. E05B 81/14 |
| 2021/0180372 | A1* | 6/2021 | Ishiguro | .................. E05B 85/26 |
| 2021/0189775 | A1* | 6/2021 | Schiffer | .................. E05B 85/26 |

FOREIGN PATENT DOCUMENTS

| | | | | |
|---|---|---|---|---|
| DE | 10 2009 029 041 A1 | 3/2011 | | |
| DE | 102009029023 A1 | 3/2011 | | |
| DE | 202011003497 U1 | 6/2012 | | |
| EP | 2310601 B1 * | 2/2016 | ............. E05B 81/14 |
| JP | 2015-74976 A | 4/2015 | | |
| JP | 2017-223034 A | 12/2017 | | |
| JP | 2019-112875 A | 7/2019 | | |

OTHER PUBLICATIONS

International Search Report dated Apr. 24, 2018, issued in International Application No. PCT/JP2018/010866 (counterpart to U.S. Appl. No. 16/761,705), with English translation. (4 pages).
Extended (Supplementary) European Search Report dated Aug. 10, 2021, issued in EP Application No. 18893757.7 (counterpart to U.S. Appl. No. 16/761,705). (7 pages).
Non-Final Office Action dated Nov. 9, 2021, issued in U.S. Appl. No. 16/761,705. (21 pages).
Non-Final Office Action dated Sep. 14, 2022, issued in U.S. Appl. No. 16/761,705. (12 pages).

* cited by examiner

PRECEDING INVENTION

PRECEDING INVENTION

PRECEDING INVENTION

PRECEDING INVENTION

PRECEDING INVENTION

PRECEDING INVENTION

PRECEDING INVENTION

PRECEDING INVENTION

PRECEDING INVENTION

Fig. 6  PRECEDING INVENTION
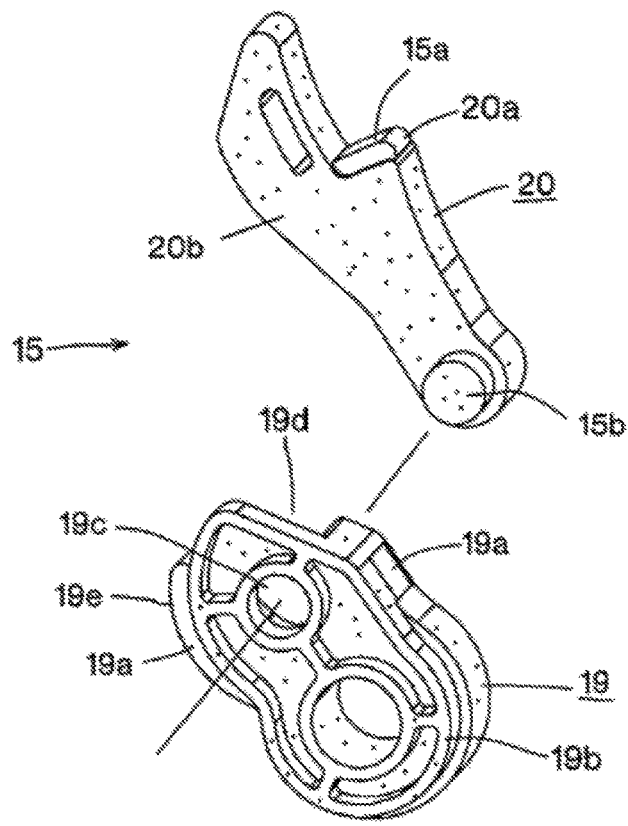
Fig. 7  PRECEDING INVENTION
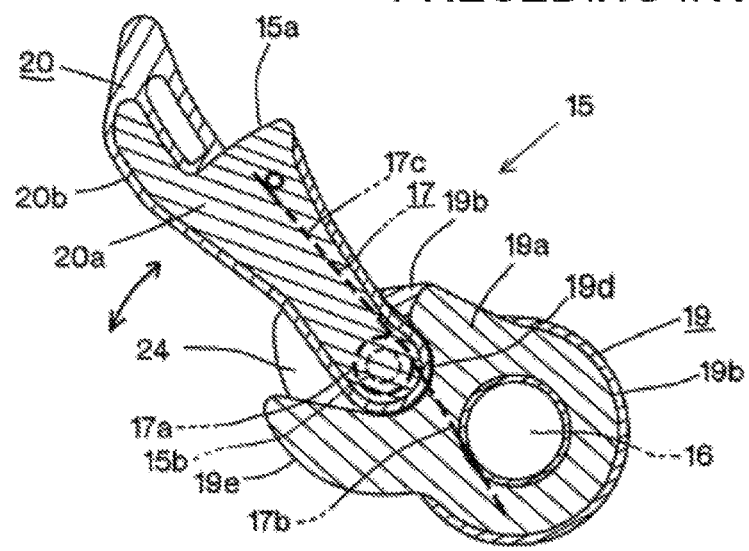

PRECEDING INVENTION

PRECEDING INVENTION

PRECEDING INVENTION

PRECEDING INVENTION

PRECEDING INVENTION

VEHICLE DOOR LATCH APPARATUS

BACKGROUND OF THE INVENTION

Technical Field

The present invention relates to a vehicle door latch apparatus, more particularly to a vehicle door latch apparatus having a reduced release operation force that is required to disengage the ratchet from the latch.

Description of the Related Art

In a typical and conventional vehicle door latch apparatus, a latch is rotated from an unlatched position to a full-latched position and engages the ratchet in order to prevent the releasing rotation of the latch and to keep the vehicle door closed (full-latched). Furthermore, in this vehicle door latch apparatus, the ratchet is rotated in the releasing direction (the direction opposite to the latch engaging direction) to disengage the ratchet from the latch by manual release operation force from the door opening handle or by electric release operation force from the power release mechanism, thereby allowing the latch to rotate in the releasing direction and placing the vehicle door in the openable state.

This kind of latch for a vehicle door latch apparatus is strongly biased in the releasing direction in the full-latched state by the resilient force of a latch spring and by a latch return force that is caused by repulsive force of a sealing element that is arranged between the door and the vehicle body. Thus, the latch strongly presses the ratchet. The friction force, that is caused by the latch strongly pressing the ratchet, acts as resistive force against the release operation force. Accordingly, the friction force degrades the operation feeling of the door opening handle and increases the output of the power release mechanism.

Patent literature 1 discloses a vehicle door latch apparatus in which the release operation force for disengaging the ratchet from the latch is reduced. FIG. 1 is a view illustrating a mechanism for reducing the release operation force in Patent literature 1. In FIG. 1, latch A is kept at the full-latched position due to the engagement with ratchet B, and ratchet B is prevented from rotating in the latch releasing direction by abutting against, ratchet restrainer C that is arranged on the side thereof. In the full-latched state shown in FIG. 1, the latch returning force that is transmitted from latch A to ratchet B is mainly supported by ratchet shaft D of ratchet B, but a part of the latch returning force acts on ratchet B as release component force E that rotates ratchet B in the latch releasing direction.

Release component force E is set to be larger than the force for keeping ratchet B engaged with latch A, more specifically, larger than the sum of friction force between latch A and ratchet B and the resilient force of the ratchet spring that biases ratchet B in the latch releasing direction. Thus, when ratchet restrainer C is rotated in the clockwise direction by the manual release operation force or by the electric release operation force in order to disengage ratchet restrainer C from ratchet B, ratchet B is rotated in the latch releasing direction by release component force E and is pushed out from the latch engaging position to the latch releasing position. As a result, latch A is disengaged from ratchet B and the vehicle door is placed in the openable state.

According to the arrangement of the vehicle door latch apparatus in Patent literature 1, the friction force between ratchet restrainer C and ratchet B acts as a resistive force against the release operation force. The resistive force is significantly reduced, as compared to a resistive force against the release operation force in the typical and conventional vehicle door latch apparatus described above, that is, the friction force that is caused by the latch pressing against the ratchet or the resistive force that is caused by the resilient force of the ratchet spring, and the release operation force are reduced accordingly.

PRIOR ART

Patent Literature

Patent Literature 1: DE102007045228

SUMMARY OF THE INVENTION

Problem to be Solved

According to the arrangement of the vehicle door latch apparatus of Patent literature 1 shown in FIG. 1, ratchet B cannot be rotated in the latch releasing direction unless ratchet restrainer C is rotated in the clockwise direction to disengage ratchet restrainer C from ratchet B by the manual release operation force or by the electric release operation force. Due to this structural limitation, only one engaging portion F, where ratchet B engages latch A, can be provided in the conventional latch A.

Now, suppose that ratchet B engages another engaging portion that is arranged on the side of engaging portion F, such as a half latching engaging portion. In this case, ratchet B, which is restrained by ratchet restrainer C such that ratchet B cannot be disengaged from latch A, is engaged with the half latching engaging portion in the mechanically locked state. When ratchet B engages the half latching engaging portion in this way, ratchet restrainer C needs to be rotated by the manual release operation force or by the electric release operation force. Therefore, it is difficult for the arrangement shown in FIG. 1 to use a typical latch in which the half latching engaging portion and the full-latching engaging portion are arranged side by side along the outer circumference of the latch.

JP2017-248491 (hereinafter, referred to as Patent literature 2) discloses an apparatus that overcomes the problem of Patent literature 1. The apparatus of Patent literature 2 is characterized by the arrangement in which the ratchet is divided into a base lever and a pawl lever.

The present invention was made by improving the invention disclosed in Patent literature 2 (hereinafter, referred to as the preceding invention). The arrangement on which the present invention is based is similar to the arrangement of the invention disclosed in Patent literature 2. It is quite beneficial to understand the arrangement of the invention disclosed in Patent literature 2 in order to understand the arrangement of the present invention. Thus, the arrangement of the invention disclosed in Patent literature 2, i.e., the preceding invention, will be described in detail with reference to FIG. 2 to FIG. 12.

FIG. 2 is a front view of vehicle door latch apparatus 10 of the preceding invention in the unlatched state (the door opened state). Latch 13 is rotatably supported by latch body (or a base plate) 11 of vehicle door latch apparatus 10 via latch shaft 12. Latch 13 is biased in the door opening direction (in the releasing direction or in the anticlockwise direction) by latch spring 14 (depicted by the arrow showing the direction of the resilient force). Typically, latch body 11 is fixed to a vehicle door (not illustrated).

Ratchet member 15 is rotatably supported by ratchet shaft 16 in the lower portion of latch body 11. Ratchet member 15 is biased in the latch releasing direction by ratchet spring 17 (depicted by the arrow showing the direction of the resilient force). In the unlatched state shown in FIG. 2, pawl portion 15a of ratchet member 15 abuts against outer circumference 13a of latch 13 by the resilient force of ratchet spring 17.

When the vehicle door is moved in the door closing direction, striker 18 that is attached to the vehicle body (not illustrated) moves relative to latch body 11 to enter horizontal striker passage 11a that is formed in latch body 11 and abuts against U-shaped striker engaging groove 13b of latch 13. As a result, striker 18 rotates latch 13 in the door closing direction (the fully-latching direction or in the clockwise direction) against the resilient force of latch spring 14. Like a typical well-known latch, latch 13 has half-latching engaging portion 13c and full-latching engaging portion 13d arranged side by side along the outer circumference thereof.

Normally, latch 13 is rotated from the unlatched position shown in FIG. 2 to the over rotating position shown in FIG. 4C through the half-latched position (FIG. 4A) where pawl portion 15a can engage half-latching engaging portion 13c and through the full-latched position (FIG. 4B) where pawl portion 15a can engage full-latching engaging portion 13d. After rotating to the over rotating position, latch 13 is rotated back in the releasing direction (in the anticlockwise direction) by the resilient force of latch spring 14 and by the repulsive force of a sealing element (not illustrated) that is provided between the door and the vehicle body, as shown in FIG. 4D.

On the other hand, pawl portion 15a of ratchet member 15 is moved to the latch engaging position by the resilient force of ratchet spring 17, then abuts against and engages full-latching engaging portion 13d of latch 13 that is rotated back to the full-latched position from the over rotating position, and the door closing operation is completed, as shown in FIG. 4D. These forces that rotate back latch 13 in the releasing direction work to function as a "latch returning force" or a "returning force" that acts on latch 13.

The returning force that is transmitted to pawl portion 15a of ratchet member 15 from full-latching engaging portion 13d of latch 13 is mainly supported by ratchet shaft 16 as main component force F1, as will be described later. On the other hand, a part of the returning force acts, as release component force F2, in a direction in which ratchet member 15 is pushed out in the latch releasing direction (the direction opposite to the latch engaging direction).

As shown in FIG. 6 to FIG. 9, ratchet member 15 of the preceding invention is divided into base lever 19 and pawl lever 20. Base lever 19 and pawl lever 20 are insert-molded and include metal plates 19a, 20a, which function as main members, and resin covers 19b, 20b for metal plates 19a, 20a, respectively. In FIG. 4A to FIG. 4D and in FIG. 5A to FIG. 5E, resin cover 19b in not illustrated.

The base portion of base lever 19 is rotatably supported by ratchet shaft 16, and the base portion of pawl lever 20 is rotatably supported by the end portion of base lever 19 via connecting rod 15b. In the preceding invention, connecting rod 15b is formed integral with pawl lever 20, and is inserted into shaft hole 19c that is formed in resin cover 19b (see FIG. 6). Pawl portion 15a is formed in metal plate 20a of pawl lever 20.

Bifurcating portion 19d is formed in the end portion of metal plate 19a of base lever 19, and the base portion of pawl lever 20 is positioned in bifurcating portion 19d. Gap 24 is formed between the base portion of pawl lever 20 and bifurcating portion 19d (see FIG. 7). Pawl lever 20 is arranged such that it can rotate about connecting rod 15b, due to gap 24, within predetermined angles relative to base lever 19.

As shown in FIG. 7, ratchet spring 17 is preferably a torsion coil spring. Central coil portion 17a is arranged around the circumference of connecting rod 15b. Spring leg portion 17b on one side abuts against ratchet shaft 16, and spring leg portion 17c on the other side abuts against pawl lever 20. Due to this arrangement of ratchet spring 17, the resilient force of ratchet spring 17 does not substantially act on base lever 19, and the resilient force exclusively biases pawl lever 20 in the latch engaging direction about connecting rod 15b.

Ratchet member 15 includes connecting rod 15b that is arranged at an intermediate position in the length direction thereof and that rotatably supports base lever 19 and pawl lever 20. Accordingly, when release component force F2 is generated in ratchet member 15, release component force F2 only acts on connecting rod 15b, which is arranged at the intermediate position, in the latch releasing direction, bends ratchet member 15 at the intermediate position, and thereby disengages pawl portion 15a from full-latching engaging portion 13d. As a result, because of release component force F2, ratchet member 15 cannot keep latch 13 at the full-latched position alone.

Ratchet restrainer 21 is arranged near the side of ratchet member 15. Ratchet restrainer 21 keeps ratchet member 15 engaged with latch 13 by preventing ratchet member 15 from being moved in the latch releasing direction by release component force F2. Ratchet restrainer 21 is rotatably supported by latch body 11 via support rod 22. Ratchet restrainer 21 is insert-molded and includes metal plate 21a, as well as resin cover 21b for metal plate 21a. In FIG. 4A to FIG. 4D and in FIG. 5A to FIG. 5E, resin cover 21b is not illustrated.

Ratchet restrainer 21 can be rotated between the blocking position shown in FIG. 2, FIG. 3 and FIG. 4A to FIG. 4D and the releasing position shown in FIG. 5D. The blocking position is the initial position for ratchet restrainer 21. Ratchet restrainer 21 is preferably biased from the releasing position toward the blocking position by the resilient force of cam biasing spring 23 (depicted by the arrow showing the direction of the resilient force). Manual release operation force from the door opening handle, the door key cylinder or the like, or electric release operation force from the power release mechanism is transmitted to ratchet restrainer 21. Due to the electric release operation force, ratchet restrainer 21 is rotated in the releasing direction from the blocking position toward the releasing position against the resilient force of cam biasing spring 23.

Metal plate 21a of ratchet restrainer 21 is a rotating cam that has, on the outer circumference thereof, arc-shaped blocking surface 21c whose center is at support rod 22 and tilted cam surface 21d that is connected to blocking surface 21c. Tilted cam surface 21d is a cam surface whose radius from support rod 22 decreases as the distance from blocking surface 21c increases. Blocking surface 21c and tilted cam surface 21d engagably face one of outer walls 19e of bifurcating portion 19d of metal plate 19a.

Ratchet restrainer 21 is kept at the blocking position, which is initial position, by the resilient force of cam biasing spring 23 when no release operation force is applied. At the blocking position, blocking surface 21c of ratchet restrainer 21 is positioned on an extension line (on the trajectory of the movement) along which connecting rod 15b of ratchet member 15 is moved by release component force F2.

In the door closed state shown in FIG. 3, outer wall 19e of base lever 19 is in contact with blocking surface 21c at the blocking position. Therefore, the latch returning force that acts on latch 13 is transmitted to pawl portion 15a of ratchet member 15 via full-latching engaging portion 13d. As a result, even when release component force F2 that pushes out ratchet member 15 in the latch releasing direction is generated in ratchet member 15 (especially, connecting rod 15b), release component force F2 that acts on connecting rod 15b is supported by blocking surface 21c (support rod 22). Connecting rod 15b is prevented from moving in the latch releasing direction and stays where it is. As a result, ratchet member 15 is not bent at the intermediate position. Pawl portion 15a is kept engaged with full-latching engaging portion 13d, and the door is kept closed. The position where outer wall 19e abuts against blocking surface 21c at the blocking position is the restricted position of base lever 19.

In the door closed state shown in FIG. 3, when the manual release operation force or the electric release operation force is transmitted to ratchet restrainer 21, ratchet restrainer 21 is rotated in the releasing direction against the resilient force of cam biasing spring 23. FIG. 5A to FIG. 5E alphabetically illustrate in detail how ratchet member 15 that operates as ratchet restrainer 21 is rotated in the releasing direction.

In the door closed state shown in FIG. 5A, when ratchet restrainer 21 is rotated in the releasing direction, blocking surface 21c, which outer wall 19e has faced and against which outer wall 19e has abutted, goes out of the line of action along which release component force F2 acts on connecting rod 15b, as shown in FIG. 5B. By this, base lever 19 (metal plate 19a) is rotated in the latch releasing direction so as to move from the restricted position to the non-restricted position, and connecting rod 15b is also moved in the latch releasing direction by release component force F2. As a result, as shown in FIG. 5C, ratchet member 15 is bent at the intermediate position, and pawl portion 15a is pushed out in the latch releasing direction from full-latching engaging portion 13d. Then, as shown in FIG. 5D, latch 13 is rotated in the releasing direction and the door is opened. The non-restricted position of base lever 19 is the position that allows connecting rod 15b to move in the latch releasing direction and that allows ratchet member 15 to be bent at the intermediate position.

After latch 13 is rotated in the releasing direction, upon disconnection of the manual release operation force or the electric release operation force that acts on ratchet restrainer 21, ratchet restrainer 21 is rotated in the direction opposite to the releasing direction back to the blocking position by the resilient force of cam biasing spring 23. Then, tilted cam surface 21d that is rotated in the direction opposite to the releasing direction presses outer wall 19e in order to push base lever 19 in the latch engaging direction from the non-restricted position back to the restricted position. Then, as shown in FIG. 5E, pawl portion 15a of ratchet member 15 abuts against outer circumference 13a of latch 13 and returns to the unlatched state shown in FIG. 2.

Next, referring again to FIG. 4A to FIG. 4D, the operation of ratchet member 15, during the door closing operation, will be described. As will be clear from FIG. 4A to FIG. 4D, ratchet restrainer 21 stays at the blocking position during the door closing operation, and base lever 19 of ratchet member 15 continues to be held at the restricted position. On the other hand, pawl lever 20 of ratchet member 15 can be independently moved in the latch engaging direction about connecting rod 15b relative to base lever 19 that is positioned at the restricted position. Therefore, the door closing force of ratchet member 15 of the preceding invention is weak as in conventional latch apparatuses. As a result, when latch 13 cannot go beyond the full-latched position shown in FIG. 4B, pawl portion 15a of pawl lever 20 engages half-latching engaging portion 13c in order to place latch apparatus 10 in the half-latched state, as shown in FIG. 12.

The relationship between ratchet restrainer 21 and ratchet member 15 in the half-latched state shown in FIG. 12 is the same as that in the full-latched state shown in FIG. 4D. Therefore, also in the half-latched state, release component force F2 that acts on connecting rod 15b of ratchet member 15 is supported by ratchet restrainer 21, and pawl portion 15a is kept engaged with half-latching engaging portion 13c, and latch 13 is prevented from rotating in the releasing direction. As a result, an unexpected opening of the vehicle door can be prevented.

The engagement of pawl portion 15a with half-latching engaging portion 13c in the half-latched state can be released by rotating latch 13 toward the full-latched position. By pushing latch 13 toward the full-latched position, tilted connecting surface 13e that is formed between half-latching engaging portion 13c and full-latching engaging portion 13d abuts against pawl lever 20. Then, due to gap 24 between pawl lever 20 and bifurcating portion 19d, pawl lever 20 is independently pushed out in the latch releasing direction without rotating base lever 19 by abutting against tilted connecting surface 13e, and disengages pawl portion 15a from half-latching engaging portion 13c.

Thus, according to the preceding invention, despite the arrangement in which ratchet restrainer 21 prevents ratchet member 15 from moving in the latch releasing direction, it is possible to arrange half-latching engaging portion 13c on the side of full-latching engaging portion 13d along the outer circumference of latch 13.

Ratchet restrainer 21 is rotated from the blocking position to the releasing position by the operation force from the door opening handle, the door key cylinder and the like or by the operation force from the power release mechanism, and then is rotated back from the releasing position to the blocking position by reversing the door key cylinder or the power release mechanism. The power release mechanism is controlled by controlling the rotational position by means of a limit switch or an abutting stopper or by time-controlling the rotational position.

The latch returning force of latch 13 is transmitted, as external force P1, from the contact point between full-latching engaging portion 13d and pawl portion 15a to connecting rod 15b, and is transmitted, as external force P2, from connecting rod 15b to ratchet shaft 16. External forces P1, P2 are each decomposed into main component force F1 and release component force F2.

Ratchet restrainer 21 of the preceding invention is rotated in the releasing direction from the blocking position to the releasing position, and is thereafter rotated in the direction opposite to the releasing direction from the releasing position to the blocking position. When ratchet restrainer 21 is rotated in the releasing direction, cam biasing spring 23 resists the release operation force. In order to rotate ratchet restrainer 21 in the releasing direction, the power release mechanism needs a circuit, a switch and the like to reverse the rotation.

Solution to Solve the Problem

A vehicle door latch apparatus according to the first aspect of the present invention comprises:

a latch that engages a striker and that rotates from an unlatched position to a full-latch over rotating position;

a ratchet member that is rotatably supported by a ratchet shaft, wherein the ratchet member has a pawl portion that is movable between a latch engaging position, where the pawl portion can face a full-latching engaging portion of the latch, and a latch releasing position, where the pawl portion is not engaged with the full-latching engaging portion; and a ratchet restrainer that is positioned on a side of the ratchet member and that restrains the ratchet member, wherein the ratchet member is configured to be pushed out from the latch engaging position to the latch releasing position by release component force that acts on the ratchet member in a latch releasing direction, wherein the release component force is generated when latch returning force that acts on the latch is applied to the ratchet member at the latch engaging position, the ratchet restrainer can move between a blocking position and a releasing position about a support rod, wherein, in the blocking position, the ratchet restrainer abuts against the ratchet member in order to prevent the ratchet member from moving from the latch engaging position to the latch releasing position by the release component force, and, in the releasing position, the ratchet restrainer is detached from the ratchet member and allows the ratchet member to move from the latch engaging position to the latch releasing position, and the ratchet restrainer is configured to return to the blocking position by rotating 360 degrees in one direction from the blocking position.

According to the second aspect of the present invention of the vehicle door latch apparatus, the latch has a half-latching engaging portion that is arranged on a side of the full-latching engaging portion.

According to the third aspect of the present invention of the vehicle door latch apparatus, the ratchet restrainer includes:

a blocking surface that is an arc surface whose center is at the support rod;

a releasing surface that is connected to the blocking surface and that has a smaller radius than the blocking surface; and a return cam surface that is provided between the releasing surface and the blocking surface along a circumference whose center is at the support rod, wherein a radius of the return cam surface gradually increases from the releasing surface toward the blocking surface.

According to the fourth aspect of the present invention of the vehicle door latch apparatus, the ratchet member has a pawl lever that can be disengaged from the full-latching engaging portion by rotating about a connecting rod in a latch releasing direction when the ratchet restrainer is at the blocking position.

According to the fifth aspect of the present invention of the vehicle door latch apparatus, the ratchet member has a base lever that is rotatably supported by the ratchet shaft, and the pawl lever is rotatably supported by the base lever via the connecting rod.

According to the sixth aspect of the present invention of the vehicle door latch apparatus, the pawl lever is configured to be rotated, independently of the base lever, about the connecting rod in the latch releasing direction by manual release operation force.

According to the seventh aspect of the present invention of the vehicle door latch apparatus, the apparatus further comprises a power release mechanism, wherein the ratchet restrainer is configured to be rotated 360 degrees in said one direction from the blocking position by electric release operation force of the power release mechanism.

Effect of the Invention

According to the vehicle door latch apparatus of the first and fourth embodiments of the present invention, in which the ratchet restrainer prevents the ratchet member from moving to the latch releasing position, the pawl portion of the ratchet member can be disengaged from the latch while keeping the ratchet restrainer at the blocking position, and the ratchet restrainer rotates 360 degrees. Therefore, a biasing spring for returning the ratchet restrainer to the blocking position can be omitted, and the power release mechanism can be downsized. In addition, since the ratchet restrainer is returned to the initial position by rotating one way, a control circuit to reverse the output of the power release mechanism can be omitted, and the arrangement of the ratchet restrainer and the power release mechanism can be simplified.

According to the vehicle door latch apparatus of the second embodiment of the present invention, it is possible to arrange both the half-latching engaging portion and the full-latching engaging portion side by side on the latch.

According to the vehicle door latch apparatus of the third embodiment of the present invention, it is possible to ensure that the blocking surface prevents the ratchet member from moving to the latch releasing position, to facilitate the release of the ratchet member by the releasing surface, and to ensure that the ratchet member returns after the ratchet member is released by the cam surface.

According to the vehicle door latch apparatus of the fifth embodiment of the present invention, it is possible to independently move the pawl lever relative to the base lever.

According to the vehicle door latch apparatus of the sixth embodiment of the present invention, it is possible to rotate the pawl lever in the latch releasing direction by the manual release operation force independently of the ratchet restrainer that is connected to the power release mechanism, and the door can be opened when a malfunction occurs in the power release mechanism.

According to the vehicle door latch apparatus of the seventh embodiment of the present invention, it is possible to rotate the ratchet restrainer by the electric release operation force of the power release mechanism.

BRIEF DESCRIPTION OF THE DRAWINGS

FIG. 6 is a perspective view of the ratchet member of the preceding invention;

FIG. 7 is a longitudinal sectional view of the ratchet member view of the preceding invention, wherein the ratchet spring is illustrated by a dashed line;

Figure 1:
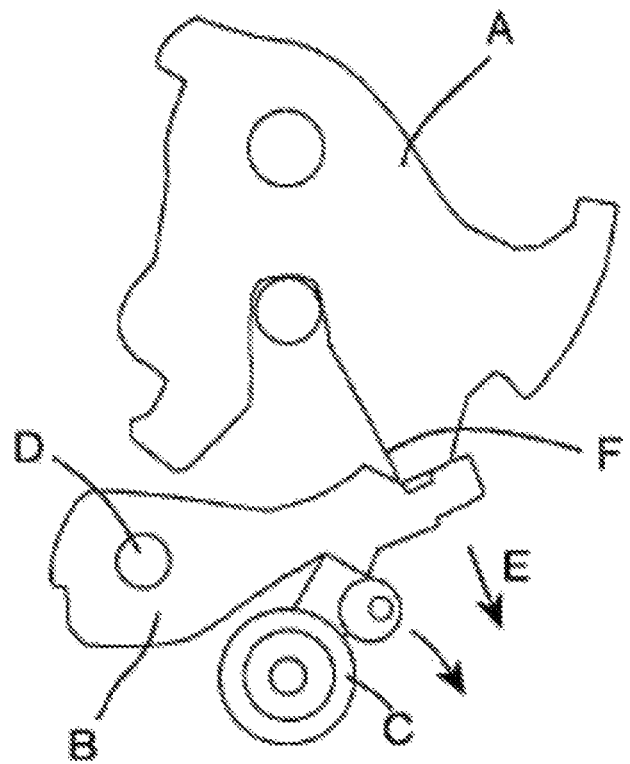
FIG. 1 is a view illustrating a conventional mechanism for reducing the release operation force.
Figure 2:
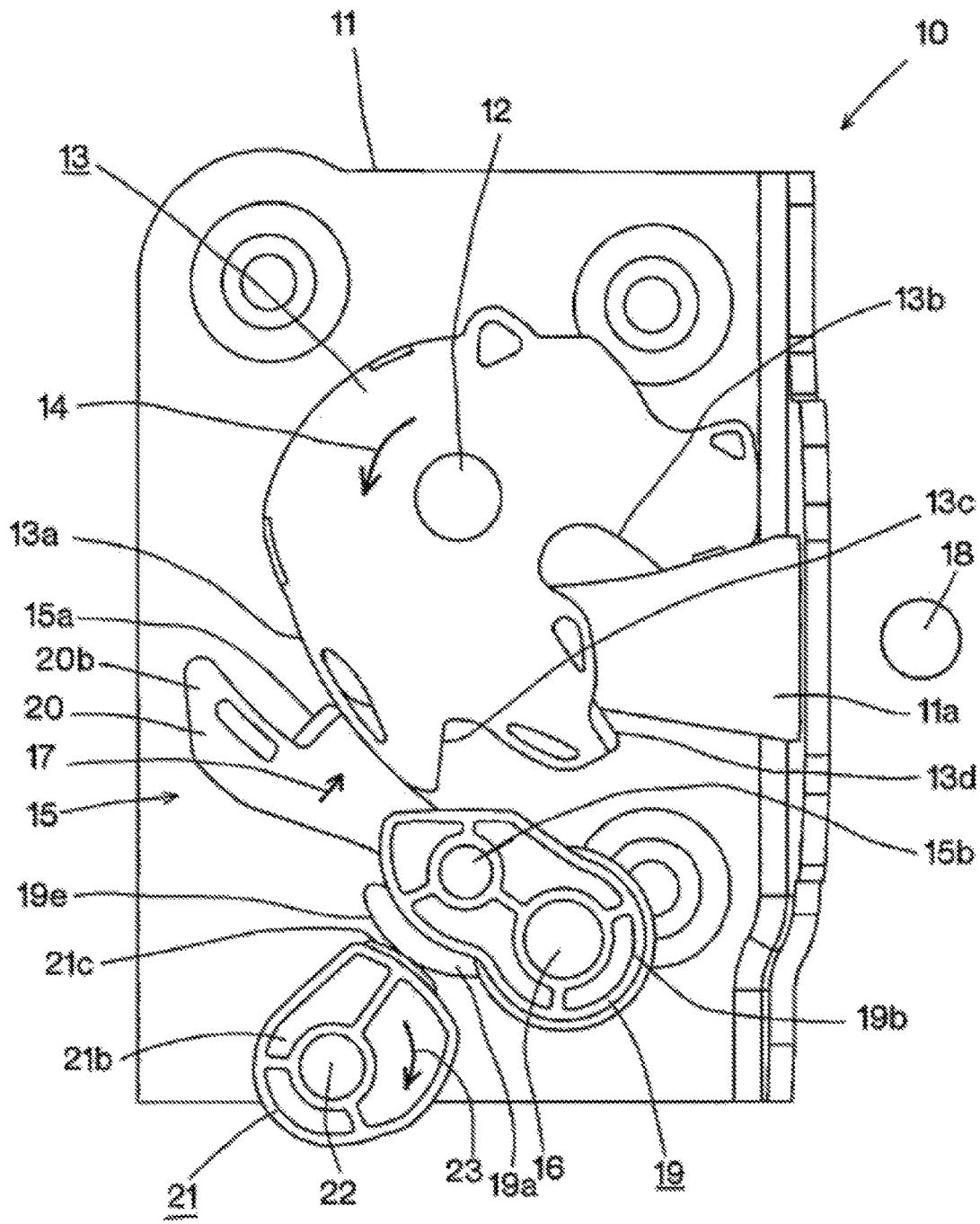
FIG. 2 is a front view illustrating a vehicle door latch apparatus of the preceding invention in the unlatched state (the door opened state)
Figure 3:
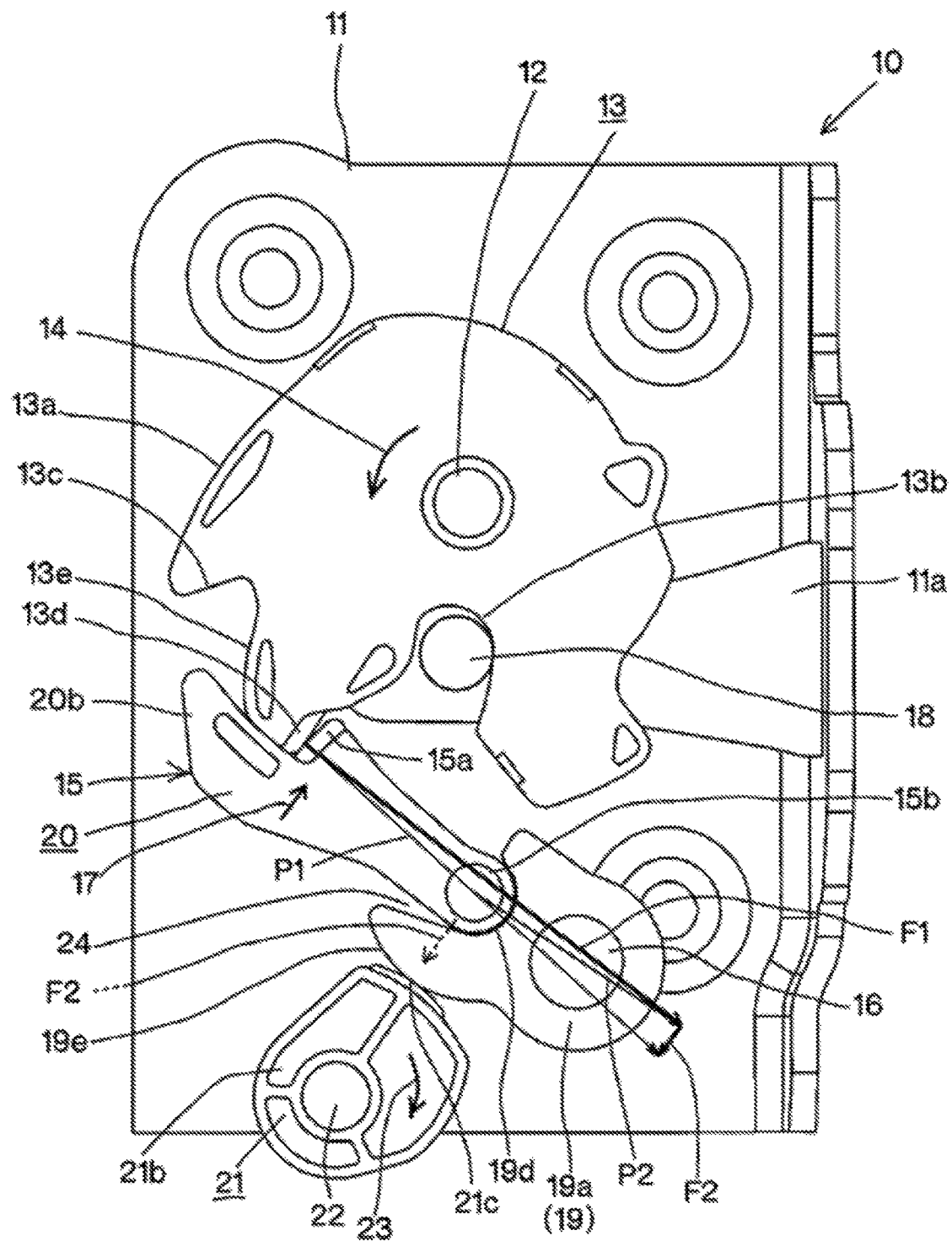
FIG. 3 is a front view illustrating a vehicle door latch apparatus of the preceding invention in the full-latched state (door closed state)
Figure 4A:
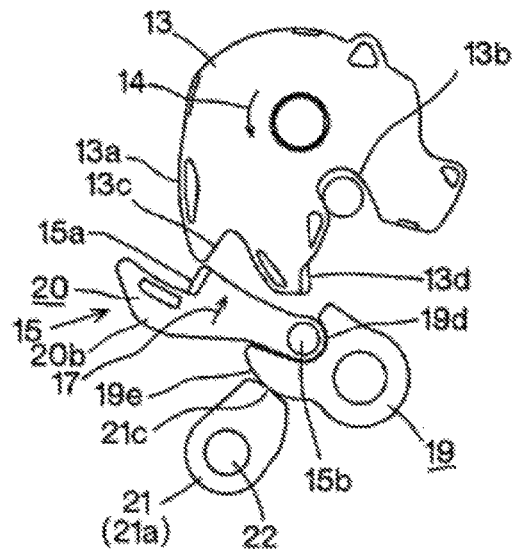
FIG. 4A is a view illustrating the door closing operation of the vehicle door latch apparatus of the preceding invention, wherein the latch has been rotated to the half-latched position.
Figure 4B:
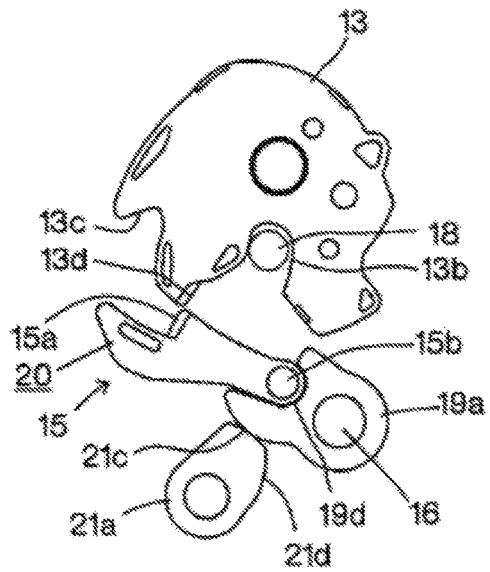
FIG. 4B is a view illustrating the door closing operation of the vehicle door latch apparatus of the preceding invention, wherein the latch has been rotated to the full-latched position after the state shown in FIG. 4A.
Figure 4C:
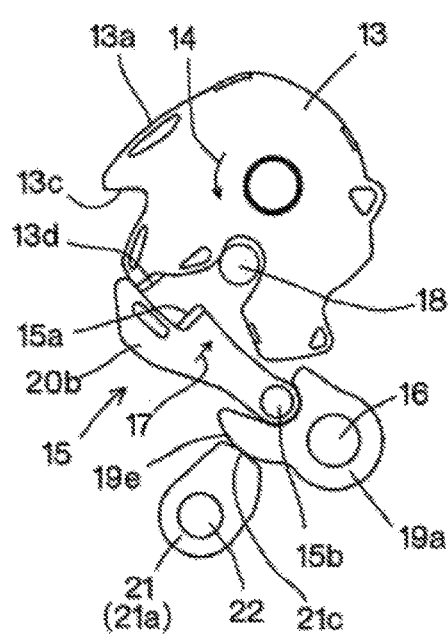
FIG. 4C is a view illustrating the door closing operation of the vehicle door latch apparatus of the preceding invention, wherein the latch has been rotated to the over rotating position after the state shown in FIG. 4B.
Figure 4D:
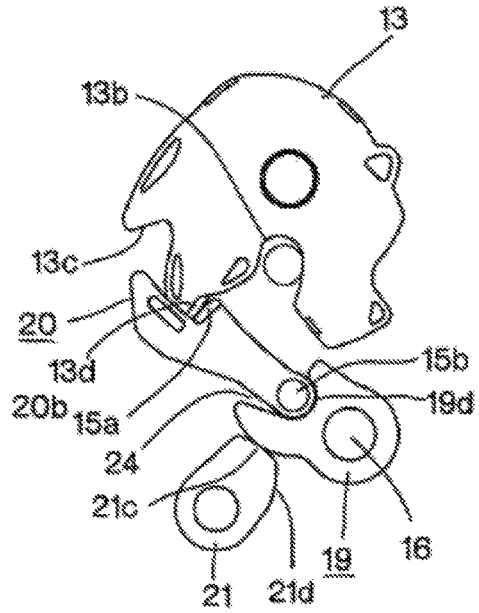
FIG. 4D is a view illustrating the door closing operation of the vehicle door latch apparatus of the preceding invention, wherein the latch that has returned to the full-latched position engages the ratchet member after the state shown in FIG. 4C.
Figure 5A:
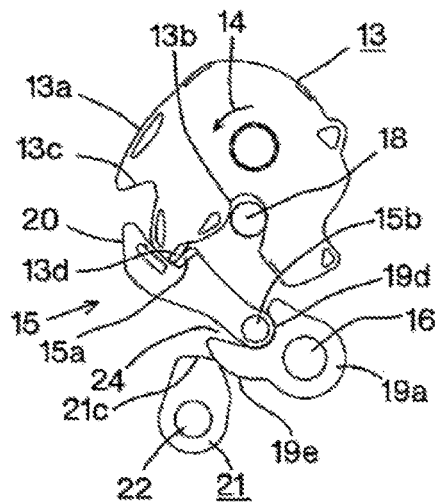
FIG. 5A is a view illustrating the door opening operation of the vehicle door latch apparatus of the preceding invention at the initial state when the ratchet restrainer is rotated in the releasing direction.
Figure 5B:
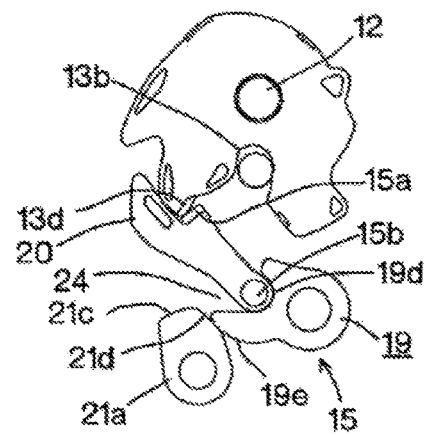
FIG. 5B is a view illustrating the door opening operation of the vehicle door latch apparatus of the preceding invention, wherein the ratchet member is bent at the maximum angle after the state shown in FIG. 5A.
Figure 5C:
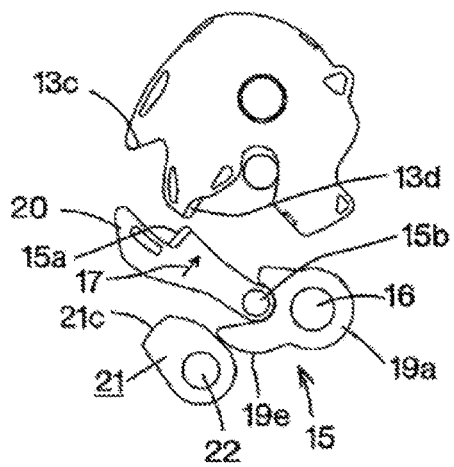
FIG. 5C is a view illustrating the door opening operation of the vehicle door latch apparatus of the preceding invention, wherein the ratchet member is disengaged from the latch after the state shown in FIG. 5B.
Figure 5D:
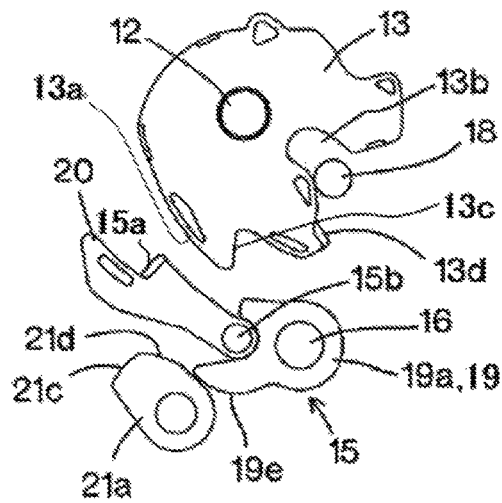
FIG. 5D is a view illustrating the door opening operation of the vehicle door latch apparatus of the preceding invention, wherein the ratchet restrainer is rotated in the releasing direction at the maximum angle after the state shown in FIG. 5C.
Figure 5E:
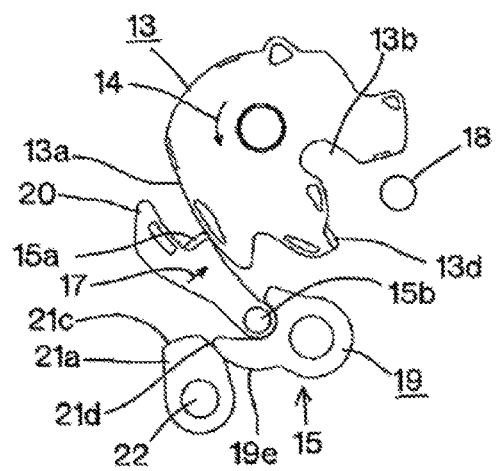
FIG. 5E is a view illustrating the door opening operation of the vehicle door latch apparatus of the preceding invention, wherein the ratchet restrainer returns to the blocking position and the ratchet member abuts against the outer circumference of the latch after the state shown in FIG. 5D.
Figure 8:
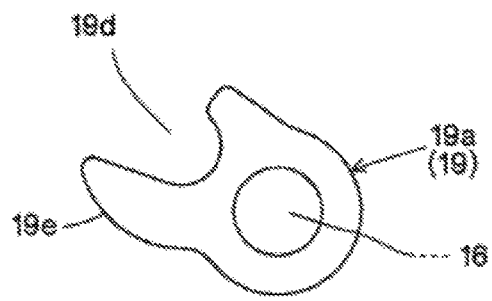
FIG. 8 is a front view of the metal plate of the base lever of the ratchet member of the preceding invention.
Figure 9:
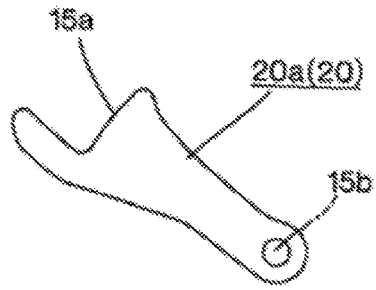
FIG. 9 is a front view of the metal plate of the pawl lever of the ratchet member of the preceding invention.
Figure 10:
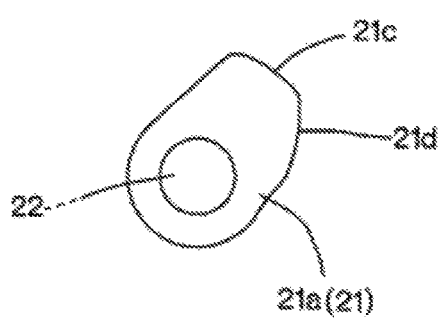
FIG. 10 is a front view of the metal plate of the ratchet restrainer of the preceding invention.
Figure 11:
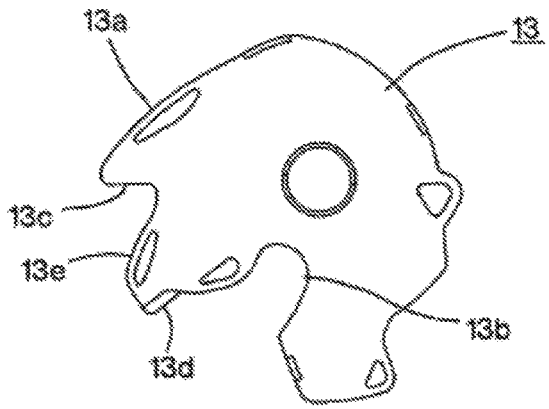
FIG. 11 is an enlarged front view of the latch of the preceding invention.
Figure 12:
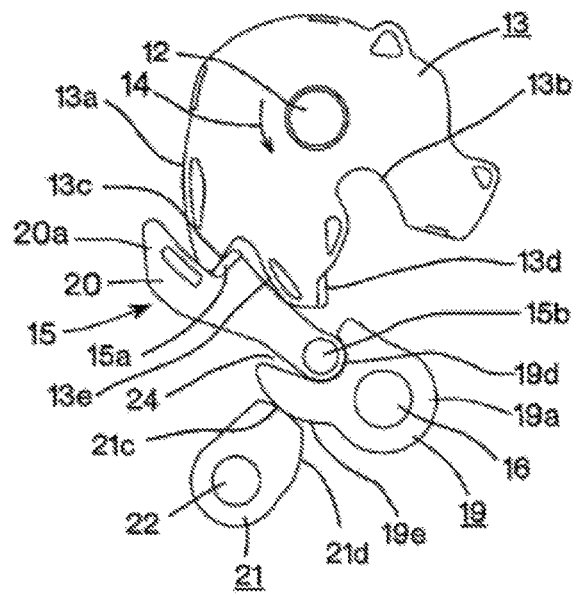
FIG. 12 is a front view of the latch, the ratchet member, the base lever and the ratchet restrainer of the preceding invention in the half-latched state in which the pawl portion of the ratchet member engages the half-latching engaging portion of the latch.

The above and other objects, features and advantages of the present invention will become apparent from the following description with reference to the accompanying drawings which illustrate examples of the present invention.

DETAILED DESCRIPTION OF THE INVENTION

Next, the present embodiment will be described with reference to FIG. 13 to FIG. 19. FIG. 13 to FIG. 19 illustrate the vehicle door latch apparatus of the present embodiment or the elements of the apparatus. The vehicle door latch apparatus of the present embodiment is made by improving the preceding invention that is described with reference to FIG. 2 to FIG. 12 (labeled "preceding art" in FIG. 2 to FIG. 12). It should be noted that, in the following description, elements of the present embodiment having the same arrangement or function as the preceding invention are given the same reference numerals and that the description may be omitted.

In vehicle door latch apparatus 10 of the present embodiment, ratchet restrainer 121 and base lever 19 of ratchet member 15 are modified, as compared to vehicle door latch apparatus 10 of the preceding invention. Specifically, ratchet restrainer 121 is configured to be able to rotate 360 degrees from the blocking position back to the blocking position via the releasing position. In other words, ratchet restrainer 121 is configured to make one revolution only in one direction.

Figure 13:
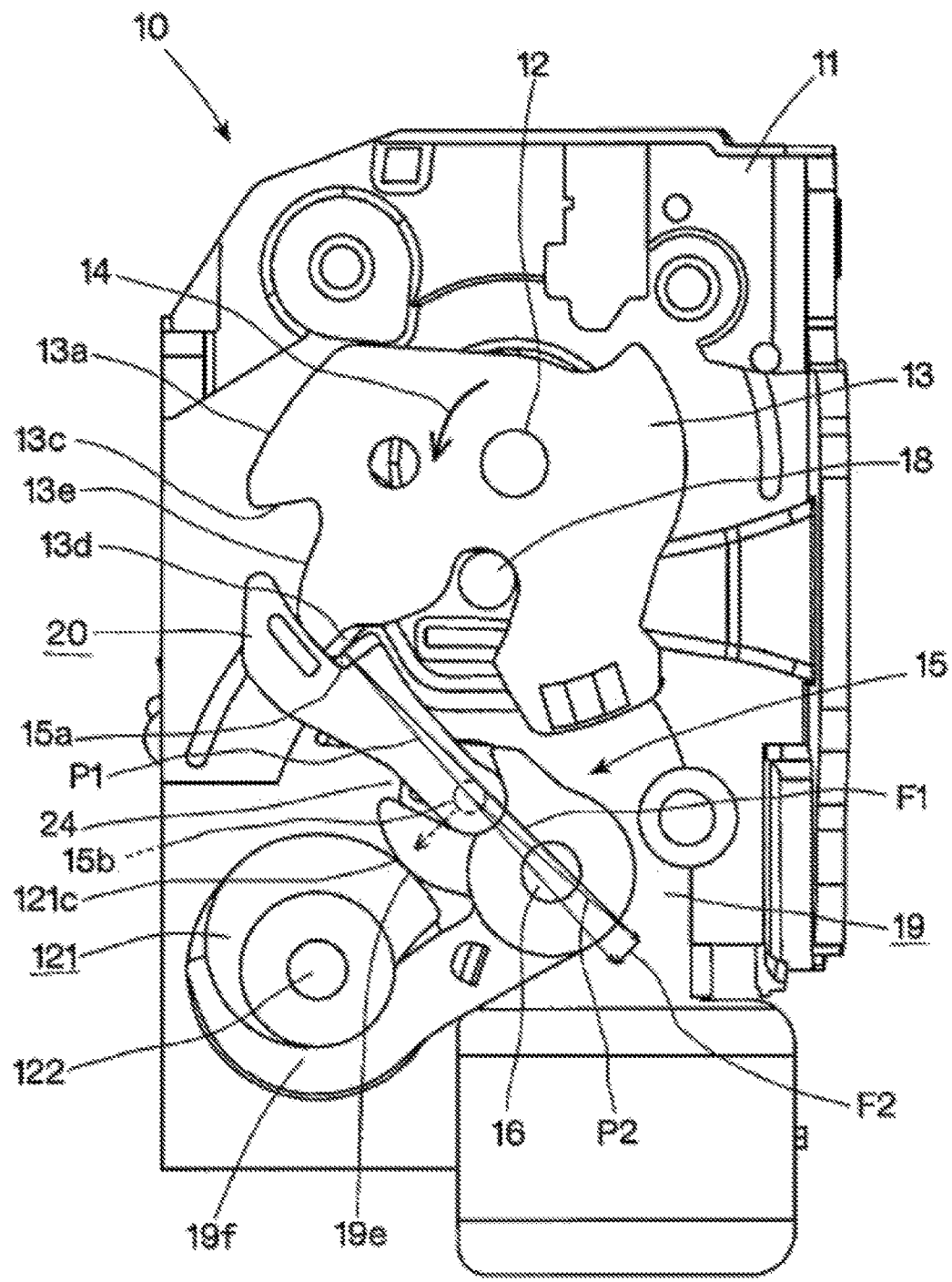
FIG. 13 is a front view of the vehicle door latch apparatus of the present embodiment in the full-latched state (the door opened state)
Figure 14:
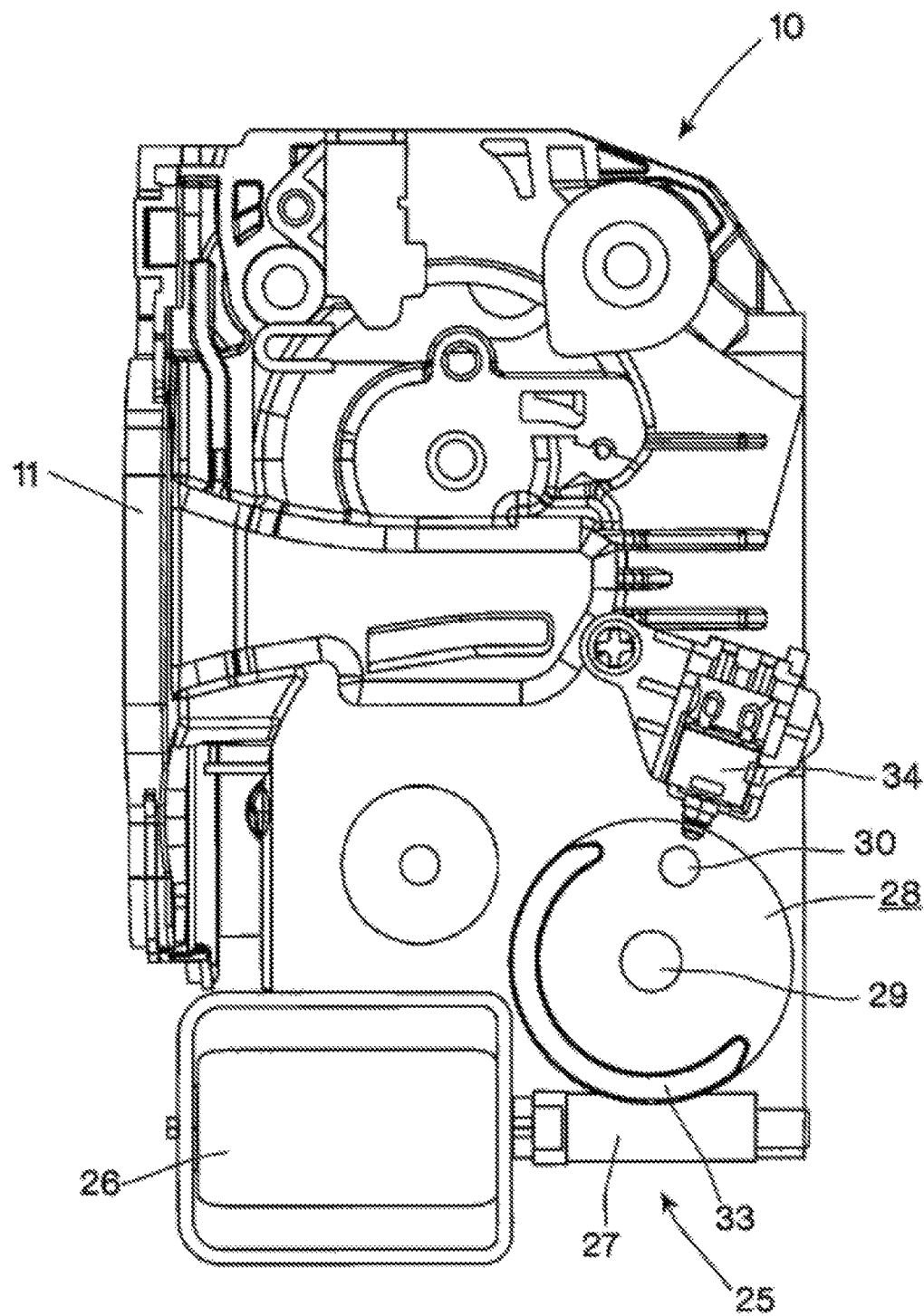
FIG. 14 is a rear view of the vehicle door latch apparatus of the present embodiment.

As shown in FIG. 13, ratchet restrainer 121 is rotatably supported by support rod 122 on the front side of latch body 11. Further, as shown in FIG. 14, motor 26 of power release mechanism 25 is arranged on the back side of latch body 11. Cylindrical worm 27 is formed on the output shaft of motor 26. Cylindrical worm 27 is engaged with outer circumferential gear 28a of worm wheel 28.

Wheel shaft 29 of worm wheel 28 is coaxial with support rod 122. Wheel shaft 29 can be shared with support rod 122 to provide a single shaft, but in the present embodiment, wheel shaft 29 is a hollow shaft having a long protrusion on the front side of latch body 11, and support rod 122 is inserted into the hollow part. Worm wheel 28 and ratchet restrainer 121 are connected to each other by means of connecting pin 30 in order to allow both elements to integrally rotate. Due to this arrangement, upon actuating power release mechanism 25, worm wheel 28 is rotated by the power of motor 26, and ratchet restrainer 121 is rotated in the anticlockwise direction in FIG. 13 via connecting pin 30.

Figure 15:
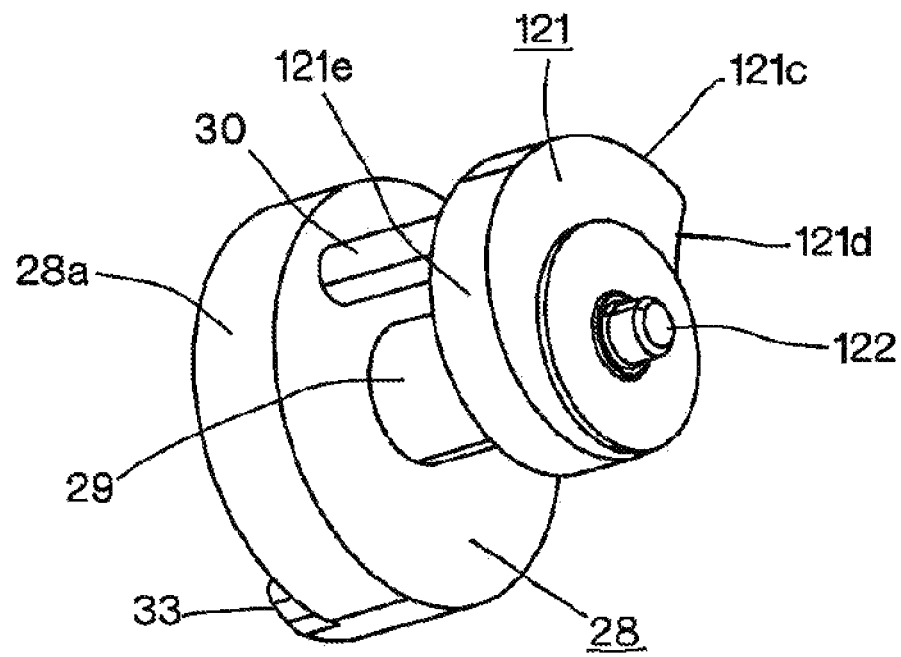
FIG. 15 is a perspective view of the ratchet restrainer and the worm wheel of the present embodiment.
Figure 16:
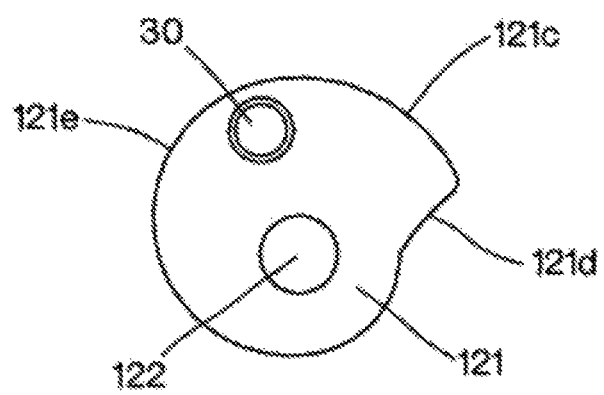
FIG. 16 is a front view of the ratchet restrainer of the present embodiment.

As shown in FIG. 15, FIG. 16 etc., blocking surface 121c, releasing surface 121d and return cam surface 121e are formed on the outer circumference of ratchet restrainer 121. Blocking surface 121c has an arc-shape whose center is at support rod 122, and prevents base lever 19 from moving in the latch releasing direction by abutting against outer wall 19e. The position where blocking surface 121c abuts against outer wall 19e is the blocking position for ratchet restrainer 121. Releasing surface 121d has a smaller radius than blocking surface 121c. When ratchet restrainer 121 is rotated in the anticlockwise direction in FIG. 13, ratchet restrainer 121 releases the blocking of outer wall 19e, allows base lever 19 to move in the latch releasing direction (to move from the restricted position to the non-restricted position). This position is the releasing position for ratchet restrainer 121. Return cam surface 121e is arranged between releasing surface 121d and blocking surface 121c along the circumference around support rod 122, and the radius gradually increases from releasing surface 121d toward blocking surface 121c. Return cam surface 121e returns base lever 19 to the restricted position by abutting against outer wall 19e of base lever 19 that has been moved to the non-restricted position by the action of releasing surface 121d. This position is the pressing position for ratchet restrainer 121.

FIG. 18A to FIG. 18D alphabetically illustrates how ratchet member 15 and latch 13 operate as ratchet restrainer 121 is rotated. It should be noted that ratchet restrainer 121 takes, for example, about 850 milliseconds to rotate 360 degrees, while latch 13 takes a shorter time, for example, about 50 milliseconds, to return from the full-latched position to the unlatched position due to the latch returning force. Thus, in FIG. 18A to FIG. 18D, the movement of each element is overexaggerated in terms of time.

Figure 17:
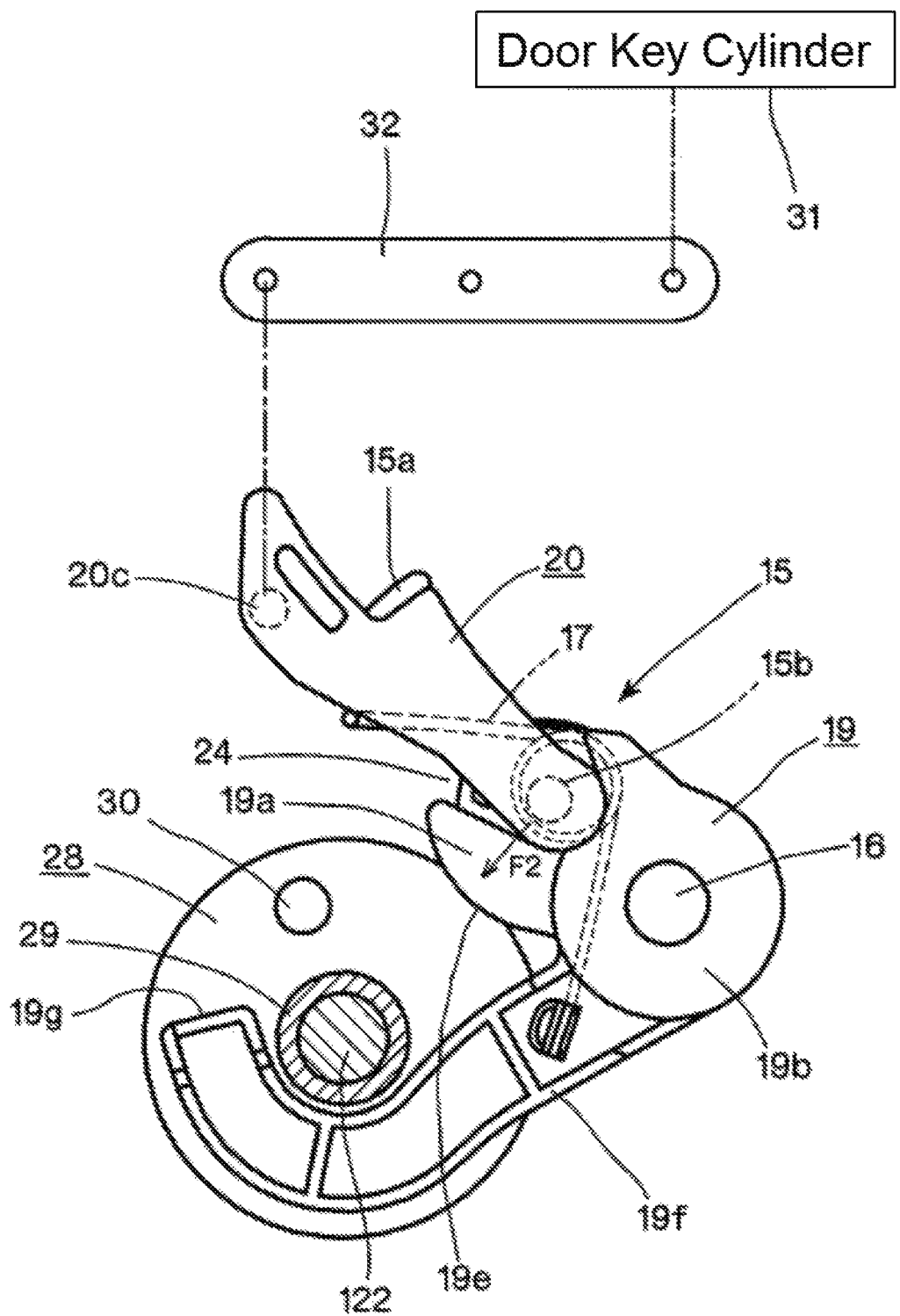
FIG. 17 is a front longitudinal sectional view of the ratchet member, the worm wheel and a part of the door key cylinder of the present embodiment, wherein the door key cylinder is operatively connected to the ratchet member.
Figure 18A:
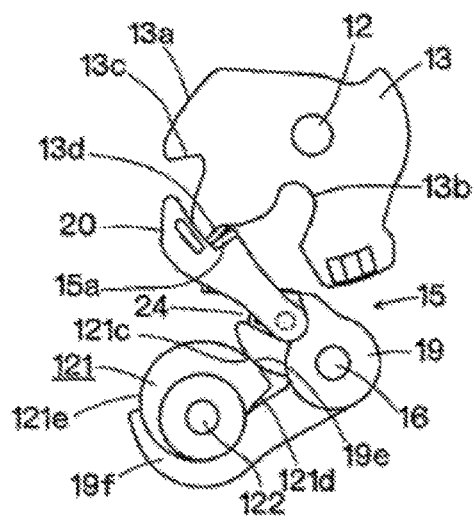
FIG. 18A a view illustrating the door opening operation of the vehicle door latch apparatus of the present invention at the full-latched state.
Figure 18B:
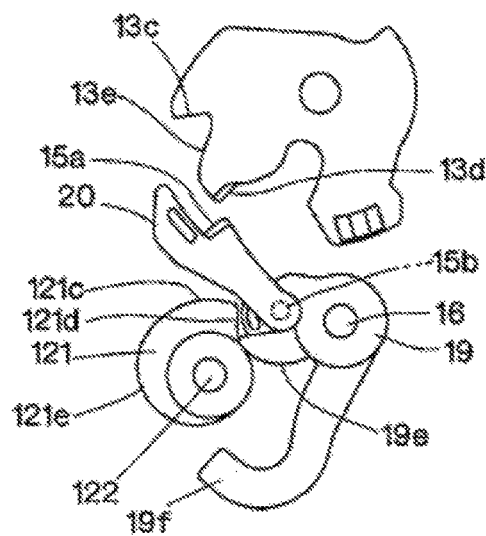
FIG. 18B a view illustrating the door opening operation of the vehicle door latch apparatus of the present invention, wherein the blocking of the base lever by the ratchet restrainer is released and the ratchet member is disengaged from the latch after the state shown in FIG. 18A.
Figure 18C:
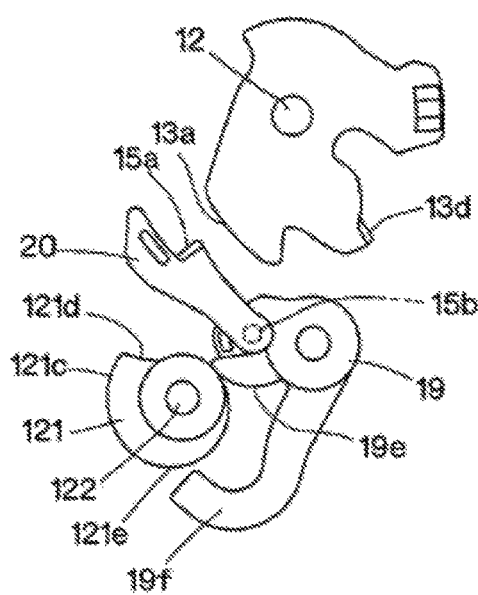
FIG. 18C a view illustrating the door opening operation of the vehicle door latch apparatus of the present invention, wherein the latch returns to the unlatched position after the state shown in FIG. 18B.

FIG. 18A is a view in the full-latched state. When ratchet restrainer 121 is rotated in the anticlockwise direction (in the releasing direction) in the state shown in FIG. 18A, outer wall 19e of base lever 19 is detached from blocking surface 121c and faces releasing surface 121d, as shown in FIG. 18B. The blocking of base lever 19 is released, ratchet member 15 is then bent at the intermediate position by release component force F2 that acts on connecting rod 15b (see FIG. 13 and FIG. 17), and pawl portion 15a is pushed out from full-latching engaging portion 13d in the latch releasing direction. As a result, latch 13 is rotated in the releasing rotation and the door is opened, as shown in FIG. 18C.

Figure 18D:
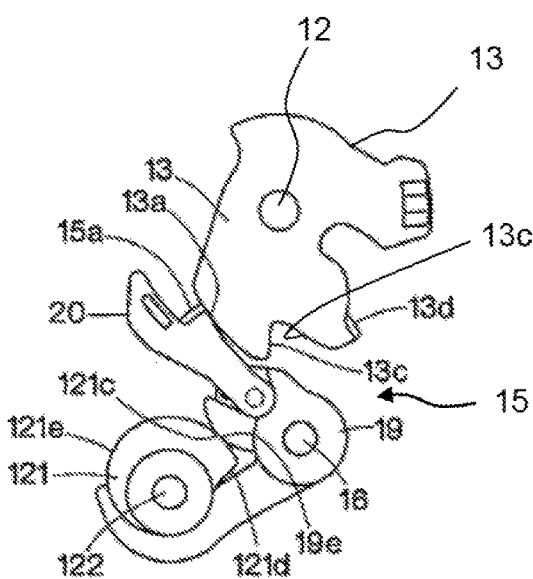
FIG. 18D a view illustrating the door opening operation of the vehicle door latch apparatus of the present invention, wherein the ratchet restrainer returns to the blocking position after rotating 360 degrees and the ratchet member abuts against the outer circumference of the latch after the state shown in FIG. 18C.

Ratchet restrainer 121 continues to rotate in the anticlockwise direction by means of power release mechanism 25 after latch 13 is released. Thus, ratchet restrainer 121 pushes base lever 19 back to the restricted position in the latch releasing direction while return cam surface 121e of ratchet restrainer 121 abuts against outer wall 19e of base lever 19. Then, base lever 19 is held at the restricted position by blocking surface 121c of ratchet restrainer 121, as shown in FIG. 18D.

Figure 19:
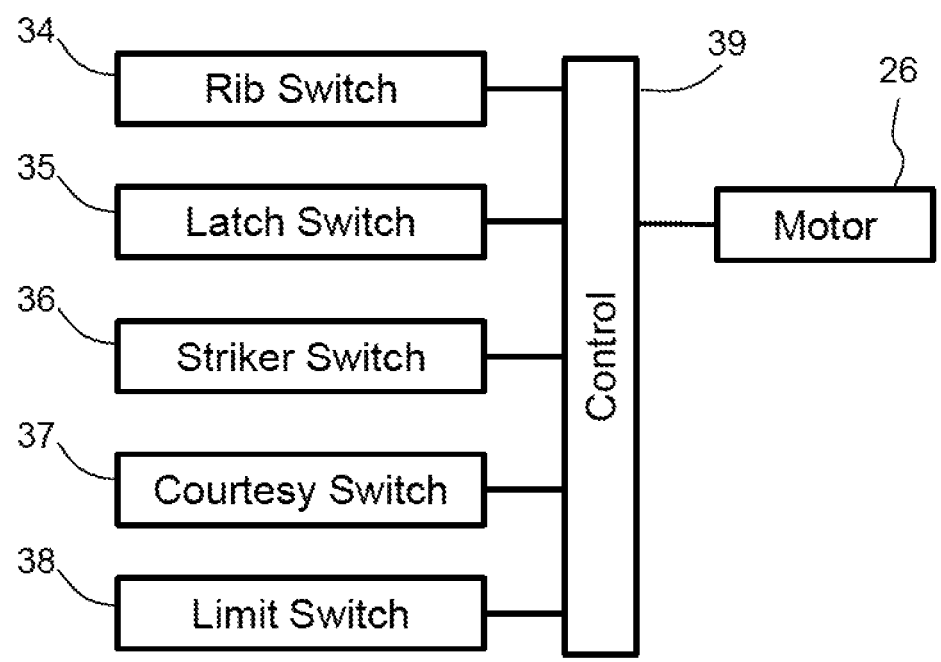
FIG. 19 is a block diagram of the control of the power release mechanism of the present embodiment.

The operation of power release mechanism 25 is disconnected after ratchet restrainer 121 has turned 360 degrees. Preferably, control 39 of power release mechanism 25 detects the rotational position of ratchet restrainer 121 by means of limit switch 38, and controls the revolution of motor 26, as shown in FIG. 19.

Ratchet restrainer 121 returns to the initial position by rotating 360 degrees. Thus, an element that corresponds to cam biasing spring 23 of the preceding invention can be omitted. Omitting the spring results in reduced resistance when power release mechanism 25 rotates ratchet restrainer 121 and in downsizing of power release mechanism 25.

In addition, since ratchet restrainer 121 of the present embodiment returns to the initial position only by rotating one way, a control circuit to reverse the output of power release mechanism 25 can be omitted. This also results in simplified structures of ratchet restrainer 121 and power release mechanism 25.

The manual release operation force from door key cylinder 31 etc. is preferably transmitted to pawl lever 20 of ratchet member 15, not to ratchet restrainer 121, as shown FIG. 17. Specifically, ratchet pin 20c is provided at the end portion of pawl lever 20 in order to transmit the manual release operation force to ratchet pin 20c via opening lever 32 etc. Pawl lever 20 that is subjected to the manual release operation force is rotated about connecting rod 15b in the latch releasing direction. Due to gap 24, pawl lever 20 can be rotated in the latch releasing direction independently of base lever 19. Thus, even if malfunction occurs in power release mechanism 25 in the door closed state, the door can be opened by the manual release operation force from door key cylinder 31 etc.

As shown in FIG. 14, arc-shaped rib 33 is formed on the back side of worm wheel 28, for example, along about half the length of the circumference, and rib switch 34 that turns on when it contacts rib 33 is formed in latch body 11. Rib 33 contacts rib switch 34 when a predetermined time lapses after power release mechanism 25 is actuated. The predetermined time is set, for example, to allow a sufficient time for latch 13 to be released from ratchet member 15 by the operation of power release mechanism 25 and to return to the unlatched position, and to be shorter than a time that is needed for return cam surface 121e of ratchet restrainer 121 to abut against base lever 19.

When the return of latch 13 to the unlatched position is not detected while rib switch 34 is on, power release mechanism 25 stops the operation and stops the rotation of ratchet restrainer 121 because an abnormal event occurs in the rotation of latch 13. Examples of the abnormal events in the rotation of latch 13 include the sticking of the door to the vehicle body due to freezing in which the door cannot be normally opened by the latch returning force alone, or sharp tilting of the vehicle that causes insufficient latch returning force to open the door.

When an abnormal event occurs in the rotation of latch 13 and power release mechanism 25 continues to operate to allow ratchet restrainer 121 to return to the blocking position, pawl portion 15a of ratchet member 15 engages full-latching engaging portion 13d or half-latching engaging portion 13c of latch 13 again, and the door returns to a state in which it is mechanically locked. Thus, in the present embodiment, when a certain condition is satisfied, the rotation of ratchet restrainer 121 is halted before return cam surface 121e of ratchet restrainer 121 abuts against base lever 19, and thereby pawl portion 15a of ratchet member 15 is prevented from engaging with full-latching engaging portion 13d or half-latching engaging portion 13c again. If pawl portion 15a is prevented from engaging with full-latching engaging portion 13d or half-latching engaging portion 13c again, then the opening of the door can be highly expected by strongly pulling the door or by melting ice with heat, for example, in case of freezing.

FIG. 19 shows a block diagram for the control of the power release mechanism 25. As disclosed in JP4530912B, in order to detect the unlatched position of latch 13, latch switch 35 that detects the rotational position of latch 13 is preferably used. Alternatively, the unlatched state of latch apparatus 10 may be detected by detecting the position of striker 18 relative to striker passage 11a by means of striker switch 36 because striker 18 is disengaged from striker passage 11a of latch body 11 by the rotation of latch 13 in the releasing direction. Alternatively, a signal from existing courtesy switch 37 that is provided in the vehicle body may also be used to detect the unlatched state.

Base lever 19 of ratchet member 15 has abutting arm 19f that extends toward support rod 122. For example, abutting arm 19f is preferably formed integral with resin cover 19b of base lever 19. Abutting surface 19g is formed at the end portion of abutting arm 19f. Abutting surface 19g is a radial surface, as viewed from the axis of ratchet shaft 16.

Abutting surface 19g abuts against connecting pin 30 in order to force base lever 19 to rotate in the latch releasing direction when worm wheel 28 is rotated by power release mechanism 25. This works as a fail-safe mechanism. Even if sufficient release component force F2 does not act on ratchet member 15, due to atypical circumstances, and ratchet member 15 is not moved in the latch releasing direction, although blocking by ratchet restrainer 121 is released, connecting pin 30 forces base lever 19 to rotate in the latch releasing direction in order to place the door in the openable state.

The present application is based on, and claims priority from, J.P. Application No. 2018-057245, filed on Mar. 23, 2018, the disclosure of which is hereby incorporated by reference herein in its entirety.

The present application is also based on, and claims priority from, J.P. Application No. 2017-248491, filed on Dec. 25, 2017, the disclosure of which is hereby incorporated by reference herein in its entirety.

BRIEF DESCRIPTION OF THE DRAWINGS 10 vehicle door latch apparatus
11 latch body
11a striker passage
12 latch shaft
13 latch
13a outer circumference
13b striker engaging groove
13c half-latching engaging portion
13d full-latching engaging portion
13e tilted connecting surface
14 latch spring
15 ratchet member
15a pawl portion
15b connecting rod
16 ratchet shaft
17 ratchet spring
17a coil portion
17b spring leg portion
17c spring leg portion
18 striker
19 base lever
19a metal plate
19b resin cover
19c shaft hole
19d bifurcating portion
19e outer wall
19f abutting arm
19g abutting surface
20 pawl lever
20a metal plate
20b resin cover
20c ratchet pin
21 ratchet restrainer
21a metal plate
21b resin cover
21c blocking surface
21d tilted cam surface
22 support rod
23 cam biasing spring
24 gap
25 power release mechanism
26 motor
27 cylindrical worm
28 worm wheel
28a outer circumferential gear
29 wheel shaft
30 connecting pin
31 door key cylinder
32 opening lever
33 rib
34 rib switch
35 latch switch
36 striker switch
37 courtesy switch
38 limit switch
39 control
121 ratchet restrainer
121c blocking surface
121d releasing surface
121e return cam surface
122 support rod
F1 main component force
F2 release component force
P1 external force
P2 external force

What is claimed is:

1. A vehicle door latch apparatus comprising;
a latch that engages a striker and that rotates from an unlatched position to a full-latch over rotating position;
a ratchet member that is rotatably supported by a ratchet shaft, wherein the ratchet member has a pawl portion that is movable between a latch engaging position, where the pawl portion can face a full-latching engaging portion of the latch, and a latch releasing position, where the pawl portion is not engaged with the full-latching engaging portion;
a ratchet restrainer that is positioned on a side of the ratchet member and that restrains the ratchet member; and
a pin that is attached to the ratchet restrainer, wherein
the ratchet member is configured to be pushed out from the latch engaging position to the latch releasing position by a release component force that acts on the ratchet member in a latch releasing direction, wherein the release component force is generated when a latch returning force that acts on the latch is applied to the ratchet member at the latch engaging position,
the ratchet restrainer can rotate between a blocking position and a releasing position about a support rod, wherein, in the blocking position, the ratchet restrainer abuts against the ratchet member in order to prevent the ratchet member from moving from the latch engaging position to the latch releasing position by the release component force, and, in the releasing position, the ratchet restrainer is detached from the ratchet member and allows the ratchet member to move from the latch engaging position to the latch releasing position,
the ratchet restrainer is configured to return to the blocking position by rotating 360 degrees in one direction from the blocking position,
the ratchet member comprises an abutting arm that extends around the support rod, wherein the pin abuts against the abutting arm when the ratchet restrainer rotates, and thereby forces the ratchet member from the latch engaging position to the latch releasing position, and the ratchet restrainer includes:
- a blocking surface that is an arc surface whose center is at the support rod;
- a releasing surface that is connected to the blocking surface and that has a smaller radius than the blocking surface; and
- a return cam surface that is provided between the releasing surface and the blocking surface along a circumference whose center is at the support rod, wherein a radius of the return cam surface gradually increases from the releasing surface toward the blocking surface.

2. The vehicle door latch apparatus according to claim 1, wherein the latch has a half-latching engaging portion that is arranged on a side of the full-latching engaging portion.

3. The vehicle door latch apparatus according to claim 1, wherein the ratchet member has a pawl lever that can be disengaged from the full-latching engaging portion by rotating about a connecting rod in a latch releasing direction when the ratchet restrainer is at the blocking position.

4. The vehicle door latch apparatus according to claim 3, wherein the ratchet member has a base lever that is rotatably supported by the ratchet shaft, and the pawl lever is rotatably supported by the base lever via the connecting rod.

5. The vehicle door latch apparatus according to claim 3, wherein the pawl lever is configured to be rotated, independently of the base lever, about the connecting rod in the latch releasing direction by a manual release operation force transmitted from an opening lever upon actuation of a door key cylinder while the ratchet restrainer is at the blocking position.

6. The vehicle door latch apparatus according to claim 1, further comprising a power release mechanism, wherein the ratchet restrainer is configured to be rotated 360 degrees in said one direction from the blocking position by an electric release operation force of the power release mechanism.

* * * * *